(12) United States Patent
Werner (10) Patent No.: US 11,207,614 B2
(45) Date of Patent: *Dec. 28, 2021

(54) SINGLE STAGE CLARIFIER AND MIXING ASSEMBLY

(71) Applicant: University of Kentucky Research Foundation, Lexington, KY (US)

(72) Inventor: Joshua Michael Werner, Lexington, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/937,032

(22) Filed: Jul. 23, 2020

(65) Prior Publication Data

US 2021/0023478 A1    Jan. 28, 2021

Related U.S. Application Data

(60) Provisional application No. 62/877,389, filed on Jul. 23, 2019.

(51) Int. Cl.
*B01D 21/24* (2006.01)
*B01D 21/00* (2006.01)
(Continued)

(52) U.S. Cl.
CPC ..... *B01D 21/2405* (2013.01); *B01D 21/0042* (2013.01); *B01D 21/0048* (2013.01);
(Continued)

(58) Field of Classification Search
CPC ............ B01D 21/0042; B01D 21/0045; B01D 21/0057; B01D 21/0087; B01D 21/08;
(Continued)

(56) References Cited

U.S. PATENT DOCUMENTS 1,701,068 A * 2/1929 Flowers ............. B01D 21/0045
210/208
2,419,004 A * 4/1947 Bieker ............... B01D 21/2405
210/519

(Continued)

FOREIGN PATENT DOCUMENTS

CA    2349048 A1    11/2002
DE    4401576    *   7/1995
(Continued)

OTHER PUBLICATIONS

Machine translation of DE 4401576, Jul. 1995 (Year: 1995).*
English Machine Translation of CA2349048A1 dated Nov. 14, 2002.
English Machine Translation of EP0434484A1 dated Jun. 26, 1991.

*Primary Examiner* — Christopher Upton
(74) *Attorney, Agent, or Firm* — Stites & Harbison PLLC; Warren D. Schickli (57) ABSTRACT

A single stage clarifier mixing assembly includes a housing having a circular sidewall and a center axis, a mixing section in the housing, a clarifier section overlying and axially aligned with the mixing section along the center axis within the housing, an inlet delivering an inlet stream to the mixing section and an agitator. The agitator is adapted for mixing the inlet stream in the mixing chamber.

16 Claims, 8 Drawing Sheets

(51) Int. Cl.
*B01F 7/00* (2006.01)
*B01D 21/28* (2006.01)

(52) U.S. Cl.
CPC ..... *B01D 21/0057* (2013.01); *B01D 21/2427* (2013.01); *B01D 21/286* (2013.01); *B01F 7/00341* (2013.01)

(58) Field of Classification Search
CPC ............... B01D 21/16; B01D 21/2405; B01D 21/2427; B01D 21/286
USPC .................. 210/519, 521, 522, 801, 802
See application file for complete search history.

(56) References Cited

U.S. PATENT DOCUMENTS

| | | | |
|---|---|---|---|
| 3,353,676 A * | 11/1967 | Hirsch | B01D 21/0042 210/519 |
| 3,473,665 A * | 10/1969 | Duff | B01D 21/08 210/519 |
| 3,615,025 A * | 10/1971 | Rice | B01D 21/2427 210/521 |
| 3,635,346 A * | 1/1972 | Zuckerman | B01D 21/0045 210/521 |
| 3,706,384 A | 12/1972 | Weijman-hane | |
| 4,086,169 A | 4/1978 | Skarheim et al. | |
| 4,110,211 A | 8/1978 | Henrikson | |
| 4,246,111 A | 1/1981 | Savard et al. | |
| 4,303,517 A * | 12/1981 | Love | B01D 21/0045 210/521 |
| 4,346,005 A * | 8/1982 | Zimmerman | B01D 21/0045 210/521 |
| 4,351,733 A | 9/1982 | Salzer et al. | |
| 4,613,434 A | 9/1986 | Maatta | |
| 4,664,802 A | 5/1987 | Lee | |
| 4,681,683 A | 7/1987 | Lindstol | |
| 4,747,948 A * | 5/1988 | North | B01D 11/0257 210/521 |
| 4,889,624 A | 12/1989 | Soriente et al. | |
| 5,049,278 A * | 9/1991 | Galper | B01D 21/0045 210/521 |
| 5,332,312 A | 7/1994 | Evanson | |
| 5,616,241 A | 4/1997 | Khudenko | |
| 5,725,810 A | 3/1998 | Brunner et al. | |
| 5,800,709 A | 9/1998 | Smith | |
| 5,800,717 A | 9/1998 | Ramsay et al. | |
| 5,947,299 A | 9/1999 | Vazquez et al. | |
| 6,540,213 B2 | 4/2003 | Bachmann et al. | |
| 6,773,586 B2 | 8/2004 | Menke et al. | |
| 7,001,525 B2 | 2/2006 | Binot et al. | |
| 8,092,688 B2 | 1/2012 | Sauvignet et al. | |
| 8,168,073 B2 | 5/2012 | Ng et al. | |
| 8,257,592 B2 | 9/2012 | Wiemers et al. | |
| 8,632,685 B2 | 1/2014 | Xu et al. | |
| 8,940,166 B2 | 1/2015 | Wiemers | |
| 9,308,471 B2 | 4/2016 | Poulter et al. | |
| 9,328,499 B2 | 5/2016 | Duncan et al. | |
| 9,415,397 B1 | 8/2016 | Christodoulou | |
| 9,421,554 B2 | 8/2016 | Gardiner et al. | |
| 9,579,659 B2 | 2/2017 | Starr et al. | |
| 9,776,106 B2 | 10/2017 | Charhut et al. | |
| 2008/0314823 A1 | 12/2008 | Kulick et al. | |
| 2011/0114545 A1 | 5/2011 | Hoefken et al. | |
| 2015/0068969 A1 | 3/2015 | Stagg et al. | |
| 2017/0165594 A1 | 6/2017 | Pazan | |
| 2018/0117503 A1 | 5/2018 | Ross et al. | |

FOREIGN PATENT DOCUMENTS

| | | |
|---|---|---|
| EP | 0434484 A1 | 6/1991 |
| WO | 8605412 A1 | 9/1986 |
| WO | 9735655 A1 | 10/1997 |
| WO | 2004108608 A1 | 12/2004 |

* cited by examiner

SINGLE STAGE CLARIFIER AND MIXING ASSEMBLY

RELATED APPLICATION

This application claims priority to U.S. Provisional Patent Application Ser. No. 62/877,389 filed on Jul. 23, 2019 which is hereby incorporated by reference in its entirety.

GOVERNMENT SUPPORT

This invention was made with government support under Grant No. DE-FE0027035 awarded by the U.S. Department of Energy. The government has certain rights in the invention.

TECHNICAL FIELD

This document relates generally to an apparatus adapted for multiple applications including leaching, adsorption and clarification.

BACKGROUND

Clarifiers that rely upon gravity sedimentation to remove particles from a slurry are well known in the art. Particle settling occurs when the settling velocity is greater than the upward fluid velocity. The settling velocities are determined by a ratio of gravity forces to drag forces and are directly proportional to the cross-section of the particle.

This document relates to a new and improved apparatus comprising a single stage clarifier and mixing assembly.

SUMMARY

In accordance with the benefits and advantages described herein, a new and improved apparatus is provided. That apparatus comprises a first single stage clarifier and mixing assembly. That first single stage clarifier and mixing assembly includes: (a) a housing having a circular sidewall and a center axis, (b) a mixing section in the housing, that mixing section including a mixing chamber within the circular sidewall, (c) a clarifier section overlying and axially aligned with the mixing section along the center axis within the housing, (d) an inlet delivering an inlet stream to the mixing section and (d) an agitator adapted for mixing the inlet stream in the mixing chamber.

More particularly, the clarifier section includes a plurality of frustoconical plates that are nested together and define a plurality of intervening flow passageways. The lowermost ends of those intervening flow passageways open into an axial passageway extending through the clarifier section along and concentrically around the center axis.

In one or more of the many possible embodiments, the apparatus may further include an inlet stream feed conduit extending along the center axis through the axial passageway to the inlet. In one or more of the many possible embodiments of the apparatus, the agitator may include a drive shaft and an impeller carried on the drive shaft. Further that drive shaft may extend along the center axis through a center of the plurality of frustoconical plates.

In one or more of the many possible embodiments, the clarifier section may further include a first outlet discharging a first outlet stream. In addition, the clarifier section may further include a clarified liquid chamber. The uppermost ends of the intervening flow passages may open into the clarified liquid chamber.

In one or more of the many possible embodiments, the clarifier section may further include a clarified liquid flow gutter extending concentrically around the clarified liquid chamber and connected to the first outlet.

In one or more of the many possible embodiments of the apparatus, the apparatus may further include a second outlet that is positioned outboard of the clarifier section in the circular sidewall. The second outlet discharges a second outlet stream.

In one or more of the many possible embodiments of the apparatus, the mixing section may further include a plurality of vanes. Those vanes may extend inwardly from the sidewall toward the impeller to assist in providing more efficient agitation and mixing.

In one or more of the many possible embodiments of the apparatus, the apparatus may further include a second single stage clarifier and mixing assembly having a structure identical to the first single stage clarifier and mixing assembly. Further, in one or more of the many possible embodiments of the apparatus, the apparatus may further include a third single stage clarifier and mixing assembly having a structure identical to the first single stage clarifier and mixing assembly.

In such an embodiment, wherein three single stage clarifier mixing assemblies are provided, the first outlet stream from the first outlet of the second single stage clarifier mixing assembly is delivered through the inlet to the mixing chamber of the first single stage clarifier mixing assembly and the first outlet stream from the first outlet of the third single stage clarifier mixing assembly is delivered through the inlet to the mixing chamber of the second single stage clarifier mixing assembly.

Still further, the second outlet stream from the second outlet of the first single stage clarifier and mixing assembly is delivered through the inlet to the mixing chamber of the second single stage clarifier and mixing assembly while the second outlet stream from the second outlet of the second single stage clarifier mixing assembly is delivered through the inlet to the mixing chamber of the third single stage clarifier mixing assembly.

In an embodiment the clarified liquid containing a reduced quantity of solids may be taken from the first (clarified) outlet of the third stage and conveyed to the mixing chamber of the second. In a like manner the clarified liquid from the second stage may be conveyed to the mixing chamber of the first. Further, in an embodiment a solid liquid mixture (slurry), may be conveyed from the first stage mixing chamber to the second, and from the second to the third. The resulting arrangement provides for the overall transfer of the liquid content counter flowing to the solids content, or counter current flow to those skilled in the art. Further, those skilled in the art are possessed of such skill as to determine any number of stages to meet their processing needs.

An additional embodiment is provided in leaching or adsorptive processes where in operation the solid remains stationary in the mixing chamber of the stage with the liquid being transferred between stages. The solid may be removed by batch process or a different liquid may be applied to the solid. Such embodiments may for example cover the loading of gold for a lixiviant where the carbon is then removed as in a carrousel arrangement or a stripping solution is directly applied in the same stage.

Additional embodiments may include provisions for the specific transfer of solids from stage to stage. For example, slurry containing solids and liquids in the concentrations found in the mixing chamber may be transferred from stage to stage. Further devices may also be used to materially reduce the liquid content transferred with the solid. Such devices may be screens, screws or any number of devices known to the art.

In accordance with an additional aspect, the apparatus may be described as comprising a first single stage clarifier and mixing assembly including: (a) a housing having a sidewall and a center axis, (b) a mixing section in the housing, the mixing section including a mixing chamber within the sidewall, (c) a clarifier section overlying and axially aligned with the mixing section along the center axis within the housing, the clarifier section including a plurality of frustoconical plates that are nested together and define a plurality of intervening flow passageways, (d) an inlet delivering an inlet stream to the mixing section and (e) an agitator adapted for mixing the inlet stream in the mixing chamber. That agitator includes a drive shaft and an impeller carried on the drive shaft. That drive shaft extends along the center axis through the clarifier section.

In accordance with an additional aspect, the new and improved apparatus comprises a first single stage clarifier mixing assembly including: (a) a housing having a sidewall and a center axis, (b) a mixing section in the housing, the mixing section including a mixing chamber within the sidewall, (c) a clarifier section overlying and axially aligned with the mixing section along the center axis within the housing, the clarifier section including a plurality of frustoconical plates that are nested together and define a plurality of intervening flow passageways, (d) an inlet delivering an inlet stream to the mixing section, and (e) an agitator adapted for mixing the inlet stream in the mixing chamber.

In the following description, there are shown and described several preferred embodiments of the apparatus. As it should be realized, the apparatus is capable of other, different embodiments and its several details are capable of modification in various, obvious aspects all without departing from apparatus as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the apparatus and the method and together with the description serve to explain certain principles thereof.

Reference will now be made in detail to the present preferred embodiments of the apparatus, examples of which are illustrated in the accompanying drawing figures.

DETAILED DESCRIPTION

Figure 1:
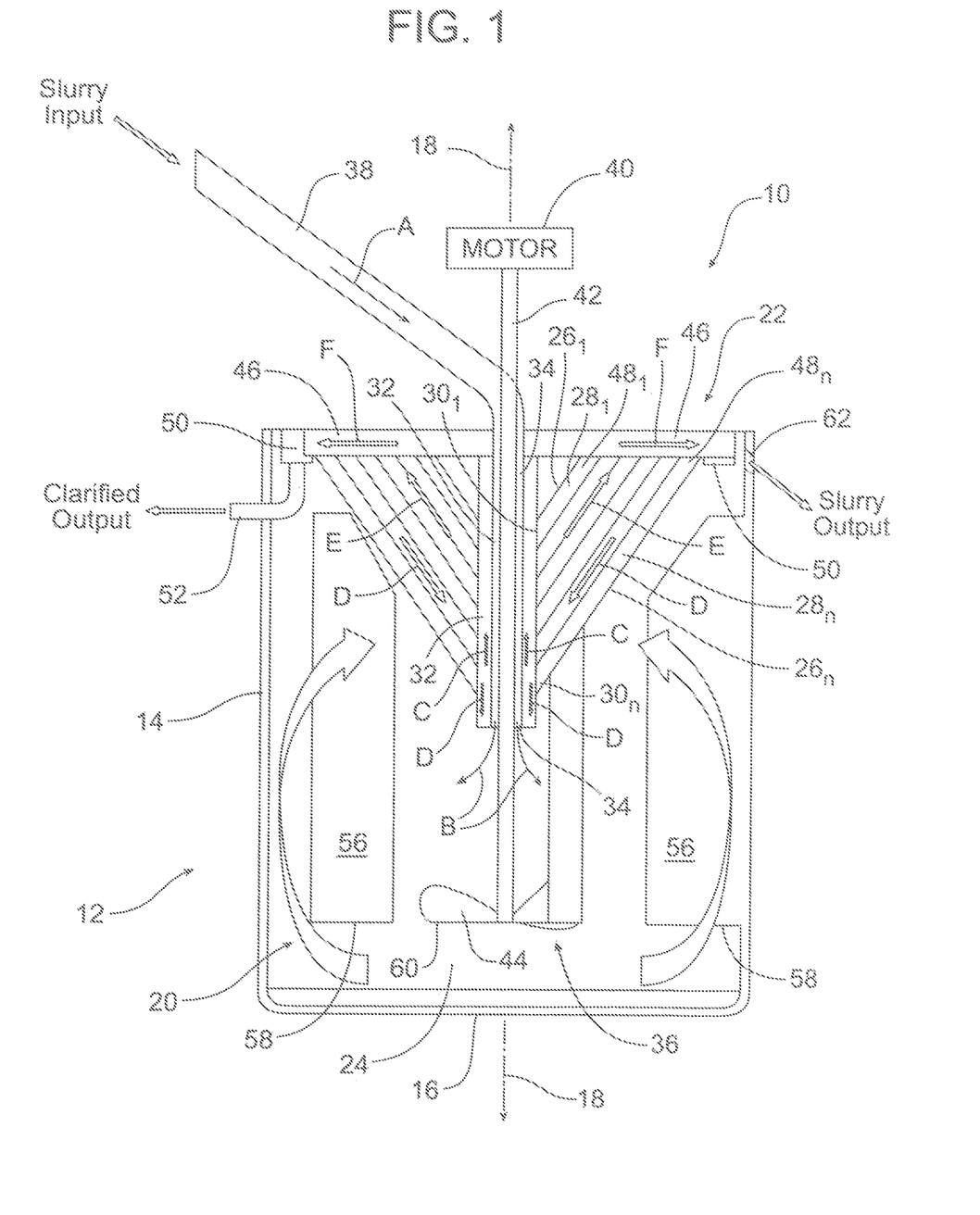
FIG. 1 is a schematic cross-sectional view of a first possible embodiment of the apparatus.
Figure 2:
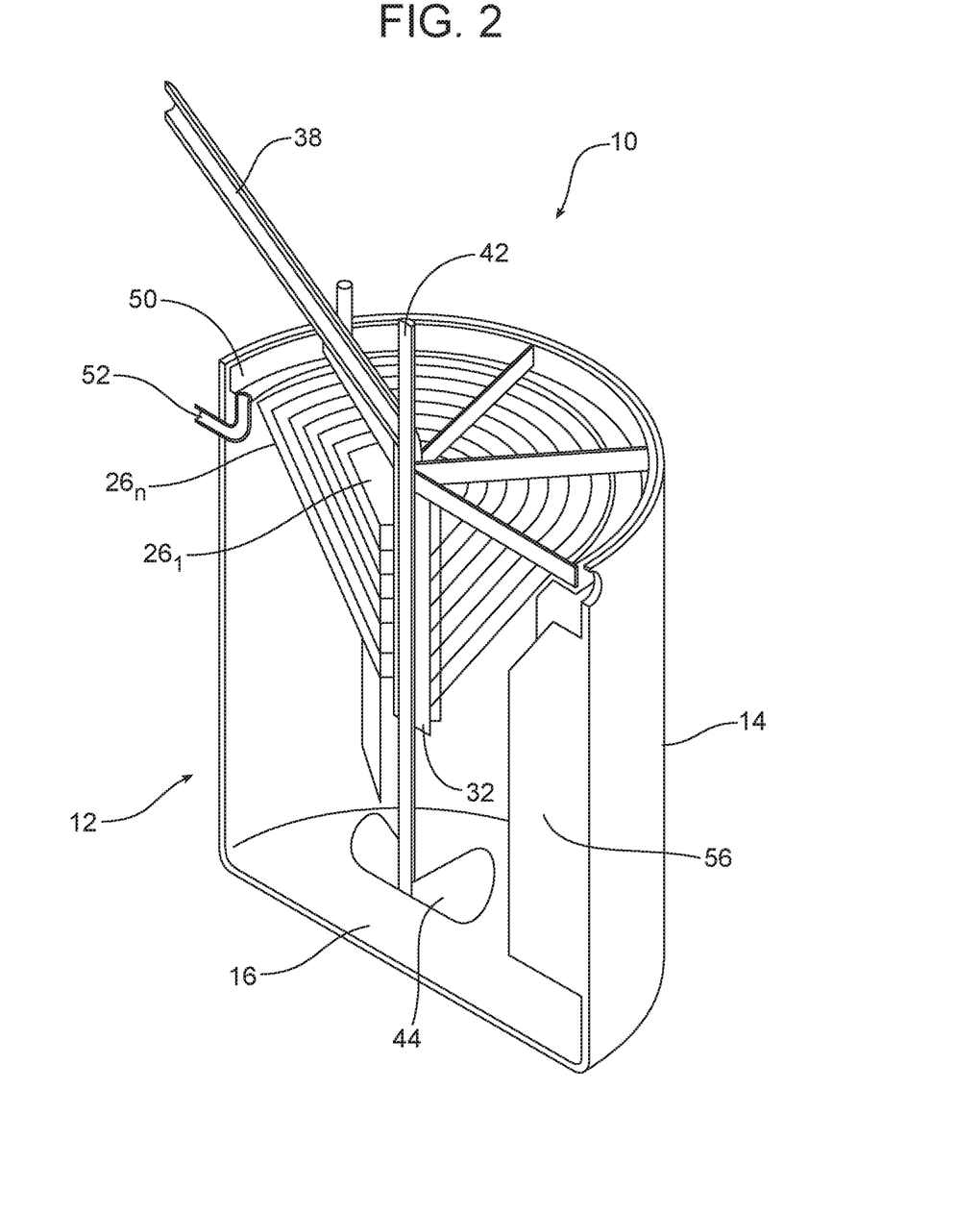
FIG. 2 is a perspective view of the cross-sectioned apparatus illustrated in FIG. 1.

Reference is now made to FIGS. 1 and 2 illustrating a first possible embodiment of an apparatus adapted for leaching, adsorption and clarification applications, including, for example, separating leachate from a slurry. The apparatus comprises a single stage clarifier and mixing assembly 10. As illustrated, the single stage clarifier and mixing assembly 10 includes a housing, generally designated by reference numeral 12, having a circular sidewall 14, a bottom wall 16 and a center axis 18. The single stage clarifier mixing assembly 10 also includes a mixing section 20 and a clarifier section 22 both held within the housing 12. More particularly, the mixing section 20 includes a mixing chamber 24 within the circular sidewall 14 and adjacent the bottom wall 16.

The clarifier section 22 overlies and is axially aligned with the mixing section 20 along the center axis 18 within the housing 12. As illustrated, the clarifier section 22 includes a plurality of plates $26_1$-$26_n$ that are nested together and define a plurality of intervening flow passageways $28_1$-$28_n$. In the illustrated embodiment, the plates $26_1$-$26_n$ are frustoconical in shape. The lowermost ends $30_1$-$30_n$ of the respecting intervening flow passageways $28_1$-$28_n$ open into an axial passageway 32 that extends through the clarifier section 22 along and concentrically around the center axis 18.

The single stage clarifier mixing assembly 10 also includes an inlet 34 adapted for delivering an inlet stream to the mixing section 20 and, more particularly, the mixing chamber 24. For purposes of this document, the terminology "inlet stream" refers to a liquid or slurry to be processed through the mixing assembly.

The single stage clarifier mixing assembly 10 also includes an agitator, generally designated by reference numeral 36, that is adapted to mixing the inlet stream in the mixing chamber 24. The single stage clarifier mixing assembly 10 also includes an inlet stream feed conduit 38 that extends along the center axis 18 through the axial passageway 32 to the inlet 34. As will be described in greater detail below, the inlet stream is fed through the feed conduit 38 to the inlet 34 where that inlet stream is delivered to the mixing chamber 24 of the mixing section 20.

The agitator 36 of the illustrated embodiment includes a drive motor 40 connected by a drive shaft 42 to an impeller 44 which, in the illustrated embodiment, is provided at the distal end of the drive shaft. As illustrated, the drive shaft 42 extends along the center axis 18 through the feed conduit 38 and the inlet 34. Thus, it should be appreciated that the feed conduit 38 and inlet 34 are concentrically disposed around the drive shaft 42; the axial passageway 32 is concentrically disposed about the feed conduit 38 and the inlet 34; and the lowermost ends $30_1$-$30_n$ of the respective intervening flow passageways $28_1$-$28_n$ and the lowermost ends of the frustoconical plates $26_1$-$26_n$ are concentrically disposed about the axial passageway 32.

As further illustrated in FIGS. 1 and 2, the clarifier section 22 also includes a clarified liquid chamber 46 overlying the uppermost ends $48_1$-$48_n$ of the intervening flow passageways $28_1$-$28_n$ as well as the uppermost ends of the frustoconical plates $26_1$-$26_n$. As should be appreciated, the uppermost ends $48_1$-$48_n$ of the intervening flow passageways $28_1$-$28_n$ open into the clarified liquid chamber 46.

The clarifier section 22 also includes a clarified liquid flow gutter 50 (i.e. overflow weir) that extends concentrically around the clarifier liquid chamber 46 and functions to feed clarified leachate to the first outlet 52 that extends from the bottom wall of the clarified liquid flow gutter 50 through the circular sidewall 14 of the housing 12. A first outlet stream is discharged from the first outlet. Depending upon the particular application, the "first outlet stream" may comprise a clarified liquid, a clarified leachate, or clarified barren solution.

As still further shown in FIGS. 1 and 2, the mixing section 20 includes a plurality of baffles or vanes 56 extending radially inwardly from the circular sidewall 14 toward the agitator 36 and, more particularly, the impeller 44. Those vanes 56 may be positioned at angularly spaced positions such as, for example, every 60 degrees. As further illustrated in FIGS. 1 and 2, the bottoms 58 of the vanes 56 may be provided at the same height as the bottom 60 of the impeller 44 from the bottom wall 16. The baffles or vanes 56 prevent the solution from spinning so as to promote agitation and mixing.

In addition, the mixing section 20 includes a second outlet 62 provided in circular sidewall 14 outboard of the clarifier section 22 at a vertical position substantially corresponding to the clarified liquid flow gutter 50: that is, substantially corresponding to the top of the frustoconical plates $26_1$-$28_n$. A second outlet stream is discharged from the second outlet 62. Depending upon the particular application, the second outlet stream may comprise a concentrated-solids slurry or a slurry of the same concentration as the mixing chamber 24.

In operation, an inlet stream, such as a slurry, is delivered to the single stage clarifier mixing assembly 10 by means of the feed conduit 38 (note action arrow A). The inlet stream passing through the feed conduit 38 is discharged from the inlet 34 into the mixing chamber 24 of the mixing section 20 (note action arrows B). The agitator 36 turns with the necessary rotational speed to mix the inlet stream (e.g. slurry) in the mixing chamber 24 and maintain the slurry in suspension. The strongest mixing action is provided at the very bottom of the mixing chamber 24 adjacent the bottom wall 16 below the bottoms 58 of the vanes 56. As the liquid flow is not all exiting via 62, the inlet stream rises in the housing 12, the inlet stream passes through the axial passageway 32 through the lowermost ends $30_1$-$30_n$ and fills the respective intervening flow passageways $28_1$-$28_n$ defined between the frustoconical plates $26_1$-$26_n$ (note action arrows C).

It is in these intervening flow passageways $28_1$-$28_n$ that lamella separation occurs and solids from the inlet stream (e.g. slurry) flow downward (note action arrows D) in the intervening flow passageways $28_1$-$28_n$ on the upper faces of the frustoconical plates $26_1$-$26_n$ under the force of gravity while clarified liquid from the inlet stream flows upward (note action arrows E) and is pushed into the clarified liquid chamber 46 through the uppermost ends $48_1$-$48_n$ of the intervening flow passageways. The resulting clarified liquid (a.k.a. first outlet stream) flows outward (note action arrows F) in the clarified liquid chamber 46 into the clarified liquid flow gutter 50 and is subsequently discharged through the first outlet 52. In contrast, a second outlet stream with concentrated solids is simultaneously forced outward at the top of the mixing chamber 24 through the second outlet 62.

Figure 3:
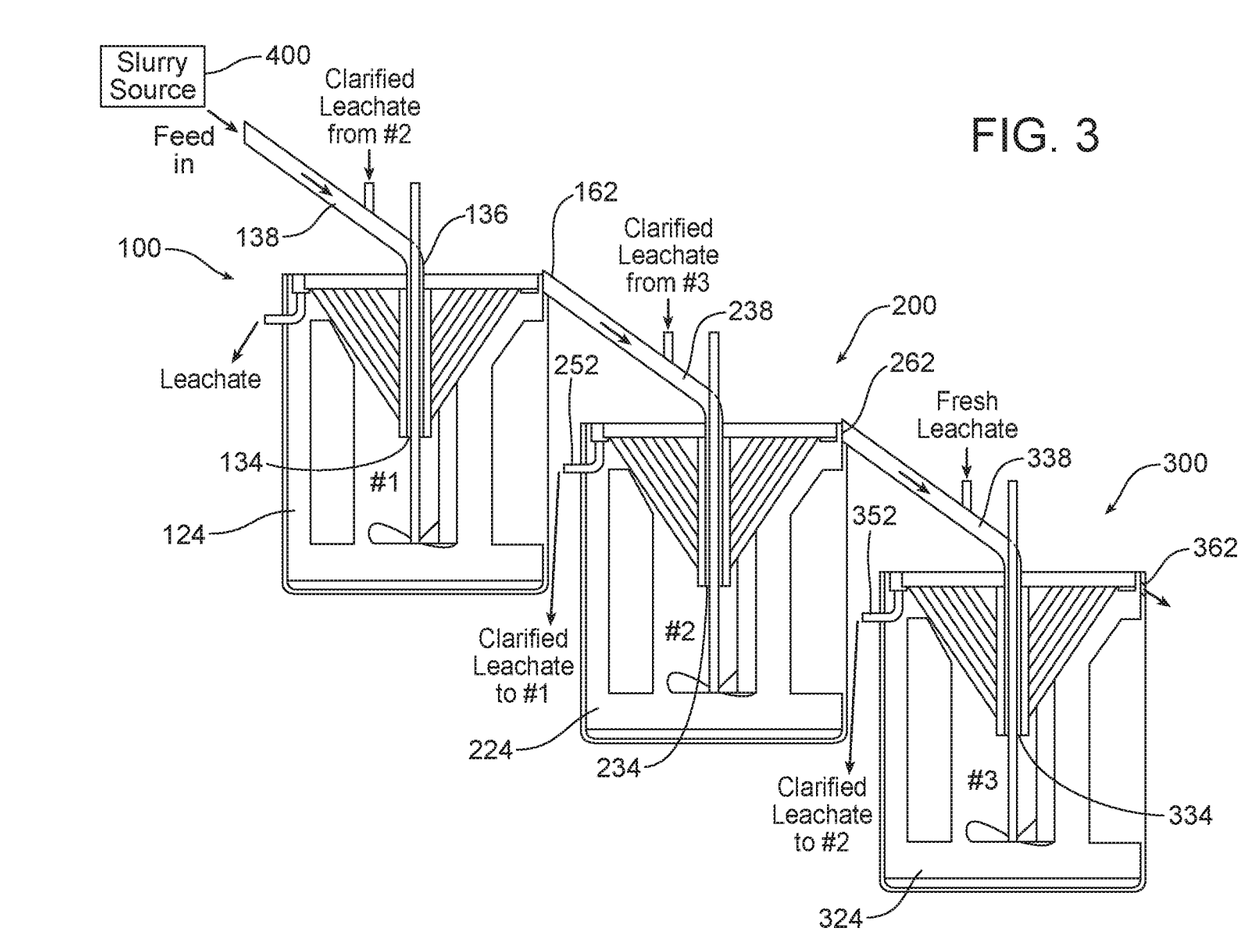
FIG. 3 is a schematic cross-sectional illustration of another possible embodiment of the apparatus incorporating three single stage clarifier mixing assemblies of the type illustrated in FIGS. 1 and 2.

Reference is now made to FIG. 3 illustrating an alternative embodiment of the apparatus incorporating a first single stage clarifier and mixing assembly 100, a second stage clarifier mixing assembly 200 and a third single stage clarifier mixing assembly 300. All three of the mixing assemblies 100, 200, 300 have a structure corresponding to the single stage clarifier and mixing assembly 10 illustrated in FIGS. 1 and 2. Together, the three single stage clarifier mixing assemblies 100, 200, 300 illustrated in FIG. 3 function as a counter-current leaching circuit. As illustrated, the first outlet stream or clarified leachate discharged from the first or clarified leachate outlet 252 of the second single stage clarifier and mixing assembly 200 is delivered to the mixing chamber 124 of the first single stage clarifier mixing assembly 100 through the feed conduit 138 and inlet 134. At the same time, the first outlet stream or clarified leachate from the first or clarified leachate outlet 352 of the third single stage clarifier and mixing assembly 300 is delivered to the mixing chamber 224 of the second single stage clarifier and mixing assembly through the feed conduit 238 and inlet 234.

In addition, the second outlet stream or slurry from the second outlet 162 of the first single stage clarifier mixing assembly 100 is delivered to the mixing chamber 224 of the second single stage clarifier mixing assembly 200 through the feed conduit 238 and the inlet 234 and the second outlet stream or slurry from the second outlet 262 of the second single stage clarifier mixing assembly is delivered to the mixing chamber 324 of the third single stage clarifier mixing assembly 300 through the feed conduit 338 and the inlet 334. Of course, the inlet stream, fresh leachate or unprocessed slurry is also being fed from a source 400 into the mixing chamber 124 of the first single stage clarifier mixing assembly 100 through the feed conduit 38 and inlet 134 while processed slurry being discharged from the outlet 362 of the third single stage clarifier mixing assembly 300 is being discharged from the system.

As should be appreciated, the plurality of frustoconical plates $26_1$-$26_n$ in the various single stage clarifier mixing assemblies 10, 100, 200, 300 are arranged so as to allow for an increase of inter-lamella area as the radius of the plates increases. The effect of this increase in inter-lamella area is that the mean stream velocity of the inlet stream or slurry in the lamella clarifier decreases with increasing radius. As the mean stream velocity of the inlet stream or slurry decreases, the settling efficiency of the solids improves as a function of radius.

While the previous description refers to separations of solid from a slurry it should be appreciated that the single stage clarifier mixing assemblies 10, 100, 200, 300 disclosed above may not only be used in liquid-solid separations, but also for purposes of liquid-liquid separation as well as part of solid-liquid reactors and liquid-liquid reactors.

The plurality of frustoconical plates $26_1$-$26_n$ and the plurality of intervening flow passageways $28_1$-$28_n$ defined between those plates may be oriented at an angle of between 15 and about 60 with respect to the center line axis 18 which extends in a vertical direction. In one particularly useful embodiment, the angle of the plurality of frustoconical plates $26_1$-$26_n$ and plurality of intervening flow passageways $28_1$-$28_n$ is approximately 35 degrees.

Figure 4:
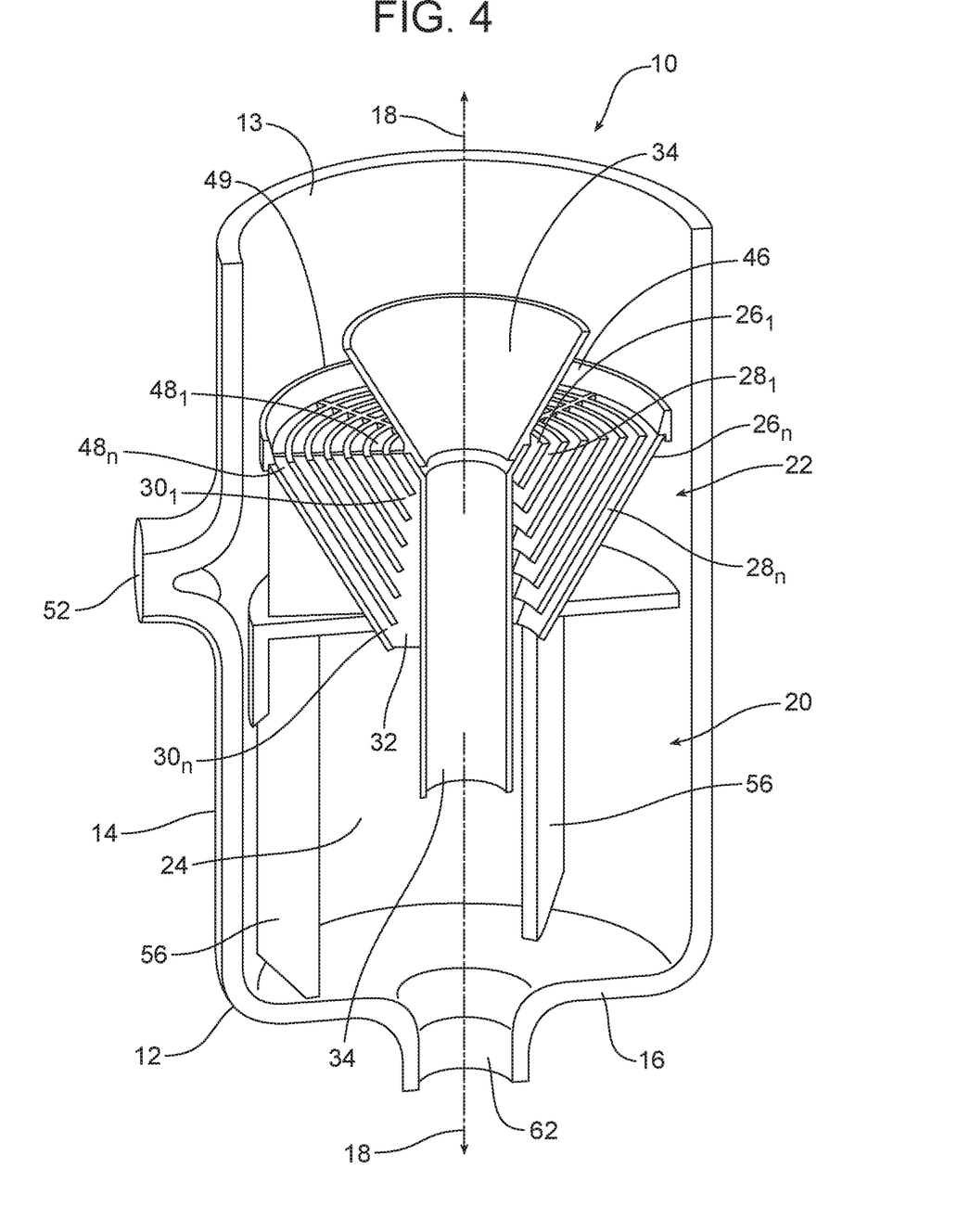
FIG. 4 is a schematic cross-sectional view of an alternative embodiment of the apparatus including a first outlet in a sidewall of the housing and a second outlet in the bottom wall of the housing.

Reference is now made to FIG. 4 which illustrates an alternative embodiment of a single style clarifier and mixing assembly 10.

Reference numbers from the FIG. 1 embodiment replicated in the FIG. 4 embodiment indicate corresponding or analogous elements.

Thus, it should be appreciated that the FIG. 4 embodiment includes a housing 12 having an open top 13, a circular sidewall 14, a bottom wall 16 and a center axis 18. The single stage clarifier and mixing assembly 10 of FIG. 4 also includes a mixing section 20 and a clarifier section 22 both held within the housing.

The clarifier section 22 overlies and is axially aligned with the mixing section 20 along the center axis 18 within the housing 12. As in the FIG. 1 embodiment, the clarifier section 22 of the FIG. 4 embodiment includes a plurality of frustoconical plates $26_1$-$26_n$ that are nested together and define a plurality of intervening flow passageways $28_1$-$28_n$.

In operation, an inlet stream, such as a slurry, is delivered to the single stage clarifier mixing assembly 10 of FIG. 4 through the open top 13 by means of the inlet 34 into the mixing chamber 24. An agitator (not shown) provides the mixing action to maintain any solids in the mixing chamber in suspension.

As the inlet stream or slurry rises in the housing 12, it passes through the axial passageway 32 through the lowermost ends $30_1$-$30_n$ and fills the respective intervening flow passageways $28_1$-$28_n$. It is there that lamella separation occurs and solids from the inlet stream or slurry flow down toward the outlet 62 in the bottom wall 16.

Simultaneously, the clarified liquid or leachate flows upward from the uppermost ends $48_1$-$48_n$ into the clarified liquid or leachate chamber 46 before flowing over the weir 49 and being discharged from the outlet 52 in the sidewall 14 of the housing 12.

Reference is now made to FIGS. 5A-5D illustrating in cross-section, four additional embodiments of single stage clarifier and mixing assemblies 10. Reference numbers from FIGS. 1 and 3 repeated in FIGS. 5A-5D once again indicate corresponding or analogous elements.

Figure 5A:
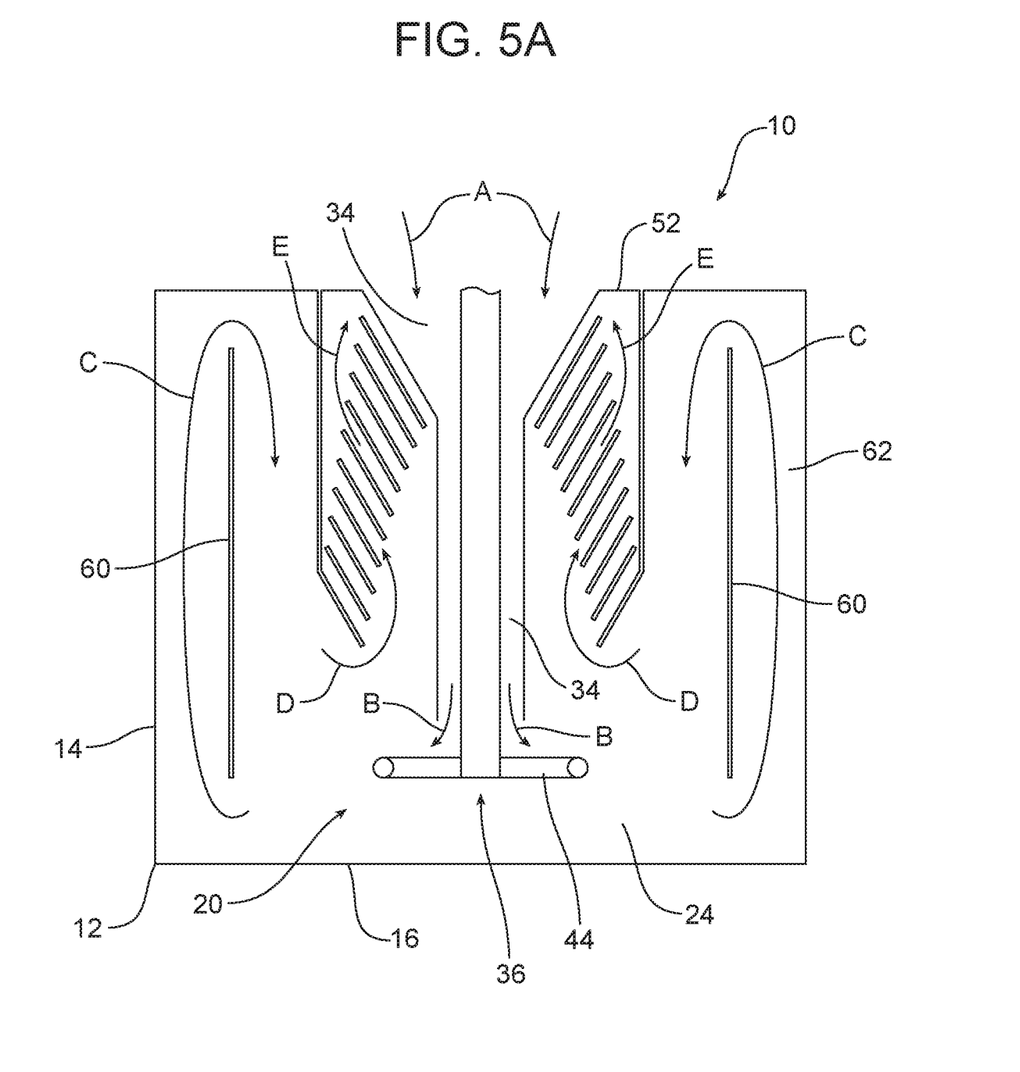
FIGS. 5A-5D illustrate four additional embodiments of the single stage clarifier and mixing assembly in cross-section.

The FIG. 5A embodiment of the mixing assembly 10 differs from the FIGS. 1 and 2 embodiment in a number of respects. The significant difference being the termination of the lamella with regards to the clarification space. In FIG. 5A the clarified liquid exits the lamella and travels vertically for discharge. In FIGS. 1 and 2 the lamella terminates in such a manner where the clarified liquid is conveyed horizontally. Functionally in FIG. 5A the lamella are similar in length with allowances made for the flow velocity in the inlet portion and outlet portion. Hence the near parabolic shape exhibited in FIG. 5A. The housing 12 has a geometry such to allow one to add the inlet stream at the center thereof as illustrated by action arrows A. An alternate embodiment would allow an inlet to the side. That inlet stream flows down the inlet 34 and out into the mixing chamber 24 (see action arrows B).

The mixing chamber 24 may include a cylindrical baffle 60 that extends a full 360 concentrically around the center axis 18 to promote mixing. That baffle 60 forms an outer flow channel 62 with the sidewall 14 of the housing 12. Thus, the inlet stream or slurry is forced outward along the bottom wall 16 by the impeller 44 of the agitator 36 and then rises upward through the flow channel 62 before flowing inward over the top edge of the baffle 60 and then downward through the inner flow channel 64 formed between the baffle and the outer wall 66 of the clarifier section 22 (note action arrows C).

The slurry is then forced through the plurality of intervening flow passageways $28_1$-$28_n$ between the plurality of frustoconical plates $26_1$-$26_n$ where lamella separation occurs (see action arrows D). Solids fall downward along the upper surfaces of the plates $26_1$-$26_n$ toward the mixing clamber 24 while clarified liquid or leachate moves upward into the clarified liquid chamber 46 from the uppermost ends of the plates toward the outlet 52 (see action arrow E). As illustrated, that clarified liquid chamber 46 extends concentrically around the plates $26_1$-$26_n$ between the uppermost ends $48_1$-$48_n$ and the outer wall 66 of the clarifier section 22. Further, the annular clarified liquid chamber 46 gradually widens as it rises.

Figure 5B:
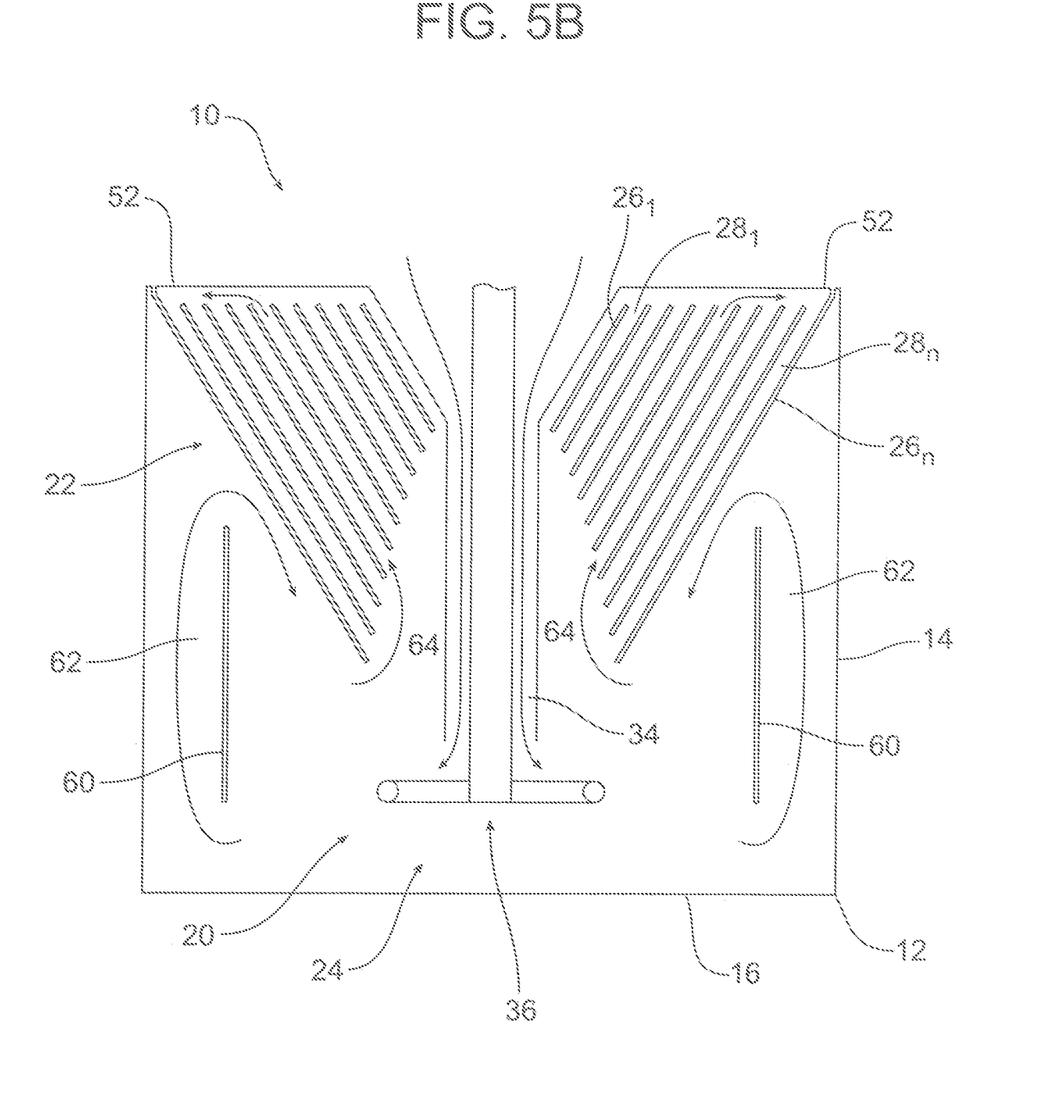

The FIG. 5B embodiment is very similar to the embodiment of FIGS. 1 and 2. The only significant differences are (a) the open top as per the FIG. 5A embodiment, (b) the vanes 56 are replaced with a cylindrical baffle 60 which forms an outer flow channel 62 with the sidewall 14 and (c) a tapered inner flow channel 64 within the clarifier section 22 to promote more uniform flow velocity to the plates $26_1$-$26_n$. The action arrows A and B illustrate the flow direction of the slurry through the mixing assembly 10 including around the baffle 62 and into the intervening flow passageways $28_1$-$28_n$ formed between the plurality of frustoconical plates $26_1$-$26_n$ providing lamella separation of the solids from the clarified leachate.

Figure 5C:
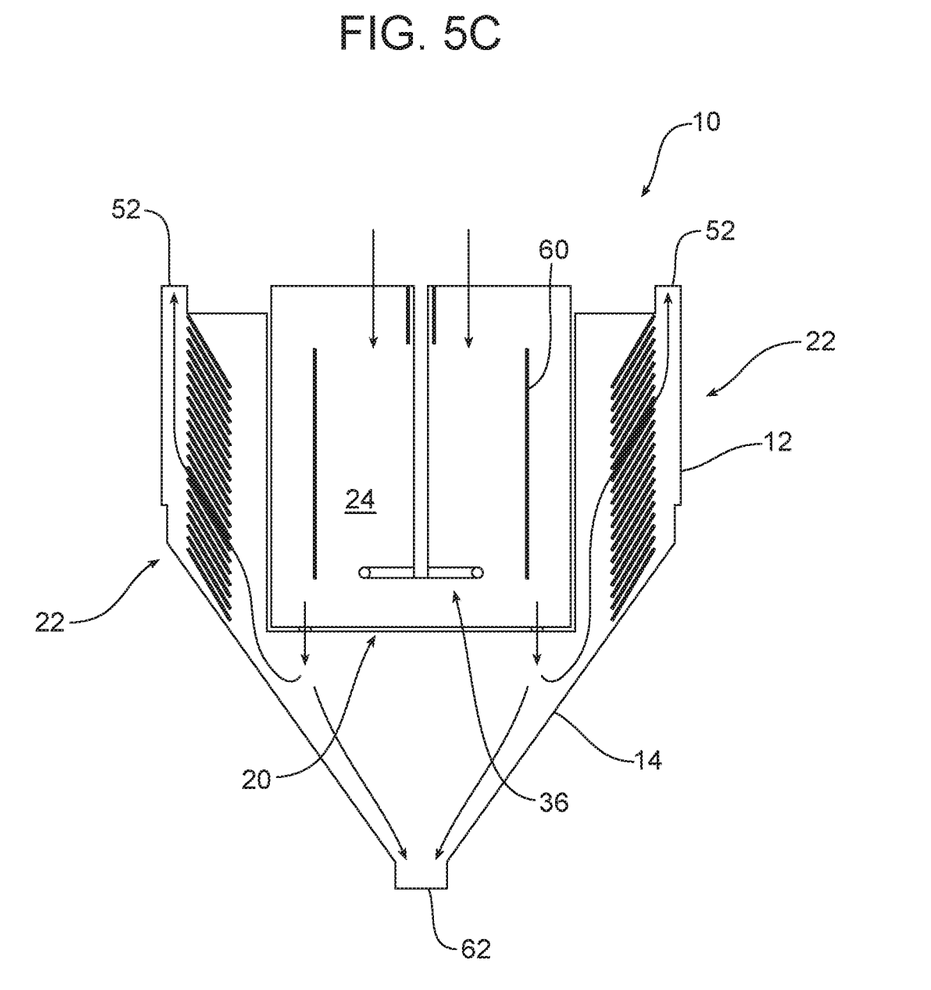
Figure 5D:
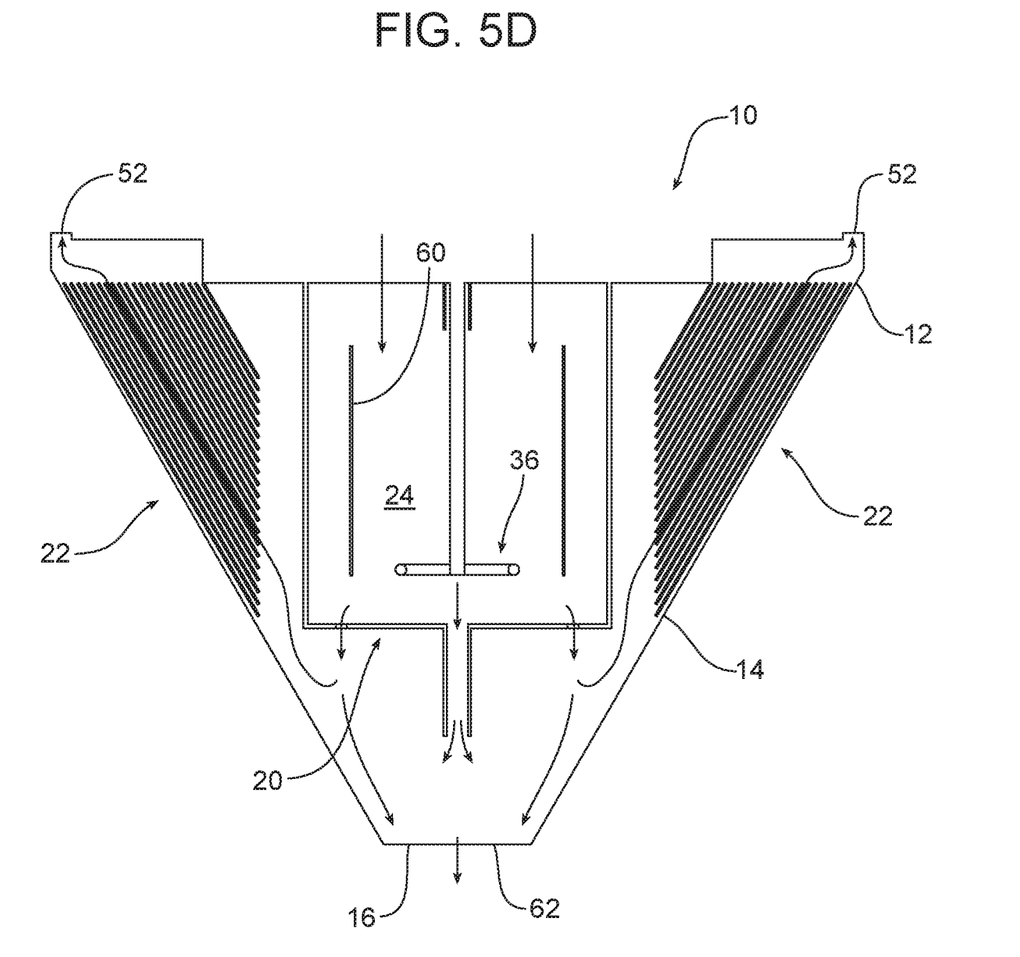

FIGS. 5C and 5D illustrates still other possible embodiments of the mixing assembly 10 wherein the clarifier section 22 is radially arrayed around and concentrically encircles the mixing section 20. The outer wall 14 of the housing 12 also is sloped so as to widen in diameter as it rises: that is, is conical or frustoconical in shape.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An apparatus, comprising:
a first single stage clarifier and mixing assembly including:
a housing having a sidewall and a center axis;
a mixing section in said housing, said mixing section including a mixing chamber within said sidewall;
a clarifier section overlying and axially aligned with said mixing section along said center axis within said housing, said clarifier section including a plurality of plates that are nested together and define a plurality of intervening flow passageways wherein lowermost ends of said plurality of intervening flow passageways open into an axial passageway extending through said clarifier section along and concentrically around said center axis;
an inlet delivering an inlet stream to said mixing section;
an inlet stream feed conduit extending along said center axis through said axial passageway to said inlet;
an agitator, positioned below said inlet stream feed conduit and said inlet, adapted for mixing said inlet stream in said mixing chamber.

2. The apparatus of claim 1, wherein said agitator includes a drive shaft and an impeller carried on said drive shaft.

3. The apparatus of claim 2, wherein said drive shaft extends along said center axis through a center of the plurality of plates.

4. The apparatus of claim 3, wherein said clarifier section further includes a first outlet discharging a first outlet stream.

5. The apparatus of claim 4, wherein said clarifier section further includes a clarified liquid chamber and uppermost ends of said plurality of intervening flow passageways open into a clarified liquid chamber.

6. The apparatus of claim 5, wherein said clarifier section further includes a clarified liquid flow gutter extending concentrically around said clarified liquid chamber and connected to said first outlet.

7. The apparatus of claim 6, further including a second outlet, outboard of said clarifier section in said sidewall, discharging a second outlet stream.

8. The apparatus of claim 7, wherein said mixing section includes a plurality of vanes extending inwardly from said sidewall toward said impeller.

9. The apparatus of claim 1, further including a second single stage clarifier and mixing assembly having a structure identical to said first single stage clarifier and mixing assembly, said second single stage clarifier and mixing assembly being located downstream from said first single stage clarifier and mixing assembly.

10. The apparatus of claim 9, further including a third single stage clarifier and mixing assembly having a structure identical to said first single stage clarifier and mixing assembly, said third single stage clarifier and mixing assembly being located downstream from said second single stage clarifier and mixing assembly.

11. The apparatus of claim 1, wherein said clarifier section further includes a clarified liquid chamber and uppermost ends of said plurality of intervening flow passageways open into a clarified liquid chamber.

12. The apparatus of claim 11, wherein said clarifier section further includes a clarified liquid flow gutter extending concentrically around said clarified liquid chamber and connected to a first outlet discharging a first outlet stream.

13. The apparatus of claim 12, further including a second outlet, outboard of said clarifier section in said sidewall, discharging a second outlet stream.

14. An apparatus, comprising:
a first single stage clarifier and mixing assembly including:
a housing having a sidewall and a center axis;
a mixing section in said housing, said mixing section including a mixing chamber within said sidewall;
a clarifier section overlying and axially aligned with said mixing section along said center axis within said housing, said clarifier section including a plurality of plates that are nested together and define a plurality of intervening flow passageways;
an inlet delivering an inlet stream to said mixing section;
an agitator, positioned below said inlet, adapted for mixing said inlet stream in said mixing chamber, said agitator being carried on a drive shaft extending through said clarifier section; and
an inlet feed conduit extending through said clarifier section and around said drive shaft to said inlet.

15. An apparatus, comprising:
(a) a first single stage clarifier and mixing assembly including:
a housing having a sidewall and a center axis;
a mixing section in said housing, said mixing section including a mixing chamber within said sidewall;
a clarifier section overlying and axially aligned with said mixing section along said center axis within said housing, said clarifier section including a plurality of plates that are nested together and define a plurality of intervening flow passageways wherein lowermost ends of said plurality of intervening flow passageways open into an axial passageway extending through said clarifier section along and concentrically around said center axis;
an inlet delivering an inlet stream to said mixing section; and
an agitator adapted for mixing said inlet stream in said mixing chamber;
(b) a second single stage clarifier and mixing assembly having a structure identical to said first single stage clarifier and mixing assembly, said second single stage clarifier and mixing assembly being located downstream from said first single stage clarifier and mixing assembly; and
(c) a third single stage clarifier and mixing assembly having a structure identical to said first single stage clarifier and mixing assembly, said third single stage clarifier and mixing assembly being located downstream from said second single stage clarifier and mixing assembly wherein a first outlet stream from a first outlet of said second single stage clarifier and mixing assembly is delivered through the inlet to the mixing chamber of the first single stage clarifier and mixing assembly and a first outlet stream from a first outlet of said third single stage clarifier and mixing assembly is delivered through an inlet to the mixing chamber of said second single stage clarifier and mixing assembly.

16. The apparatus of claim 15, wherein (a) a second outlet stream from a second outlet of the first single stage clarifier and mixing assembly is delivered through the inlet to said mixing chamber of said second single stage clarifier and mixing assembly and (b) a second outlet stream from a second outlet of the second single stage clarifier and mixing assembly is delivered through the inlet to said mixing chamber of said third single stage clarifier and mixing assembly.

* * * * *